April 22, 1969

G. H. JANTZEN 3,439,933

SHOULDER HARNESS RETRACTOR

Filed Feb. 21, 1968

Sheet _1_ of 2

INVENTOR.
GEORGE H. JANTZEN
BY M. Robt. Kestenbaum
ATTORNEY

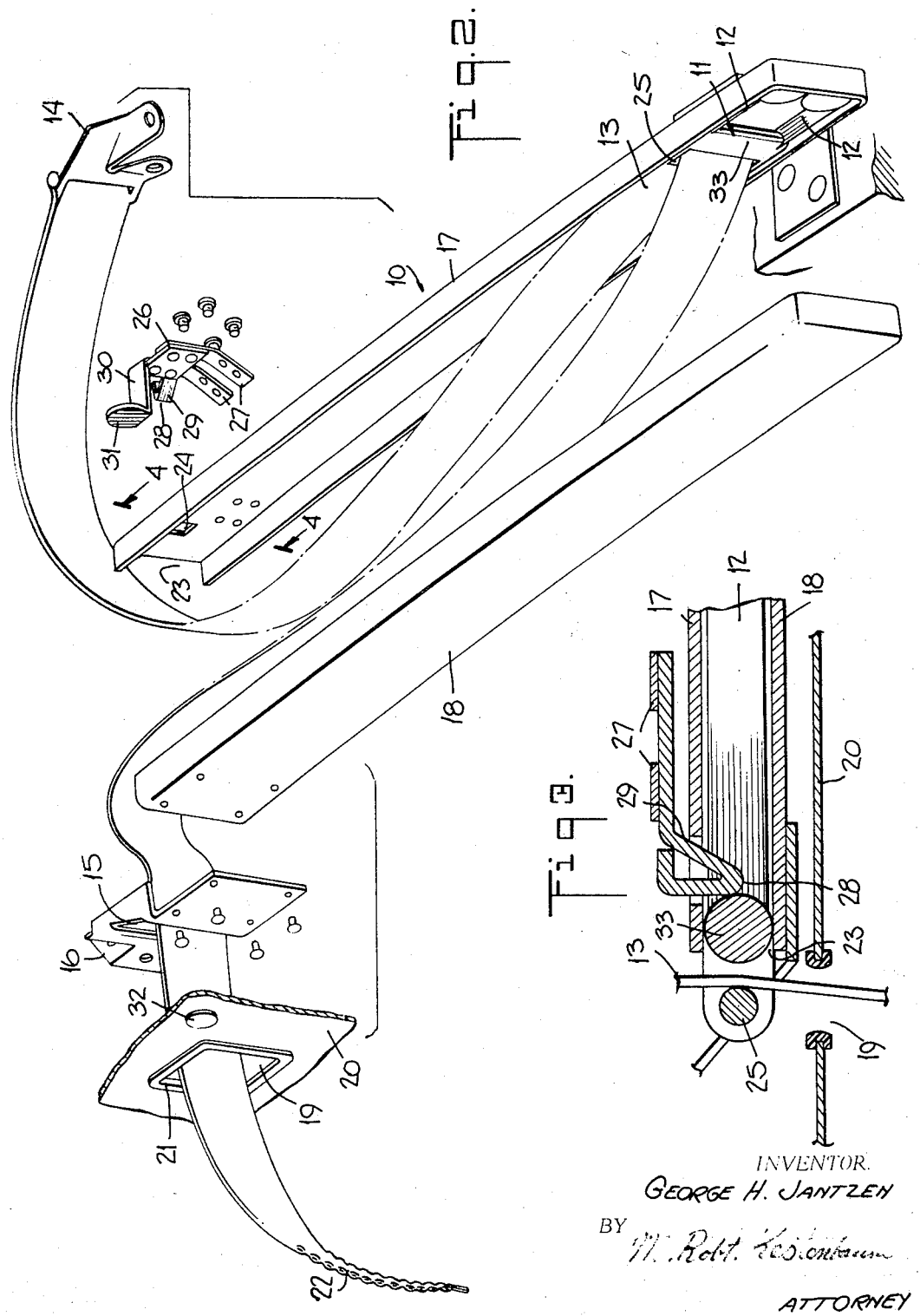

United States Patent Office 3,439,933
Patented Apr. 22, 1969

3,439,933
SHOULDER HARNESS RETRACTOR
George H. Jantzen, New York, N.Y., assignor to M. Steinthal & Company Incorporated, New York, N.Y., a corporation
Filed Feb. 21, 1968, Ser. No. 707,171
Int. Cl. B60r 21/10; A62b 35/00
U.S. Cl. 280—150                                    5 Claims

ABSTRACT OF THE DISCLOSURE

Self-locking retractors for shoulder harness belts in vehicles which automatically retain the shoulder harness in its fully extended position until it is no longer desired.

---

This invention relates to retractors for shoulder harness belts in vehicles and more particularly to a self-locking retractor which automatically retains the shoulder harness in its fully extended position until it is no longer desired.

With the advent of shoulder harnesses as an important safety aid in combination with seat belts various pieces of hardware have been designed for hanging up the harness within the vehicle body when not in use. However, substantial advantages would accrue in terms of appearance and safety if the shoulder harness were made to retract out of the vehicle interior when not in use. Appearance-wise, the spector of a number of straps hanging doubled within the vehicle is eliminated. Safety-wise, a successful retractor would facilitate ready acceptance of shoulder harnesses by the using public.

Depending upon the buckling arrangement employed for securing the shoulder harness over the user, the end of the harness may have an end fitting which could injure the user to a greater or lesser degree if the harness is allowed to retract upwards of its own will when the harness is released.

Accordingly, it is an object of this invention to provide a retractor for shoulder harnesses which locks the harness in its fully extended position until the user purposefully actuates the retractor.

Another object of the invention is to provide a shoulder harness retractor which removes the harness from hanging within the interior of a vehicle upon actuation of a conveniently located means for that purpose.

These objects are accomplished in the present invention in which a retractor is mounted above the seat behind the headliner of the body to pull the harness through an aperture in the headliner. The retracter has a locking system comprised of a locking element which is spring-biased to engage the retractor and render it inoperative when the harness is in its fully extended position. A lever affixed to the locking system extends behind the headliner towards the vehicle interior and is operable by the user to disengage the locking element from the retractor.

These and other objects and features of this invention will become apparent in the following description in conjunction with the attached drawings in which:

FIGURE 2 is an exploded view of the retractor.

FIGURE 3 is a section view of one end of the retractor and the locking means taken through section lines 3—3 in FIGURE 1.

Figures 4, 5:
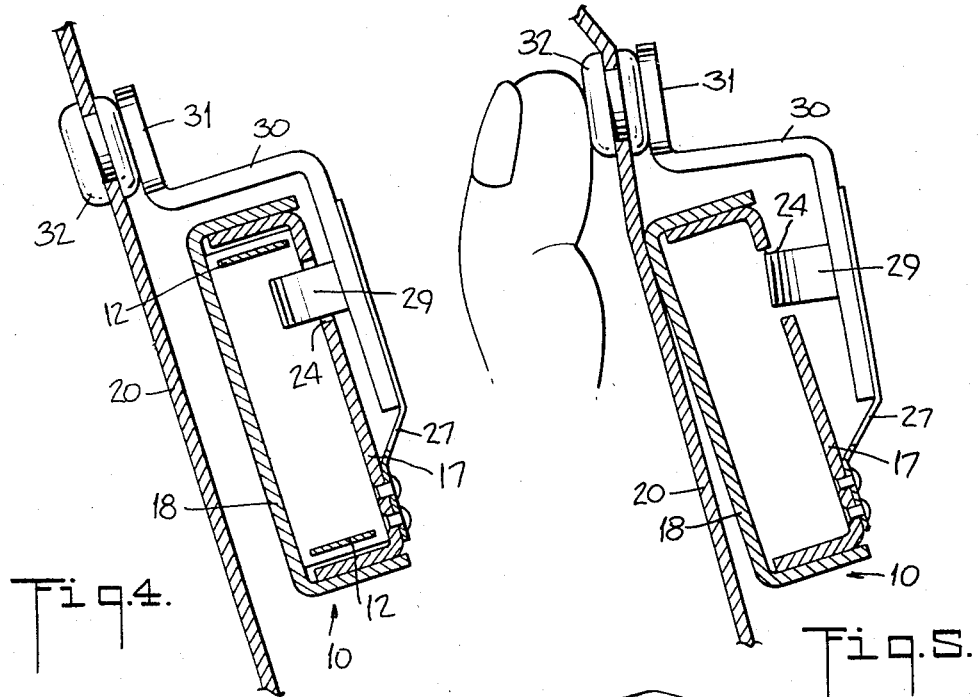
FIGURE 4 is a section view of the retractor taken through section lines 4—4 in FIGURE 2 and showing the locking means in its engaged position.
FIGURE 5 is a view of the same section as in FIGURE 4 showing the locking means actuated into its disengaged position.
Figure 1:
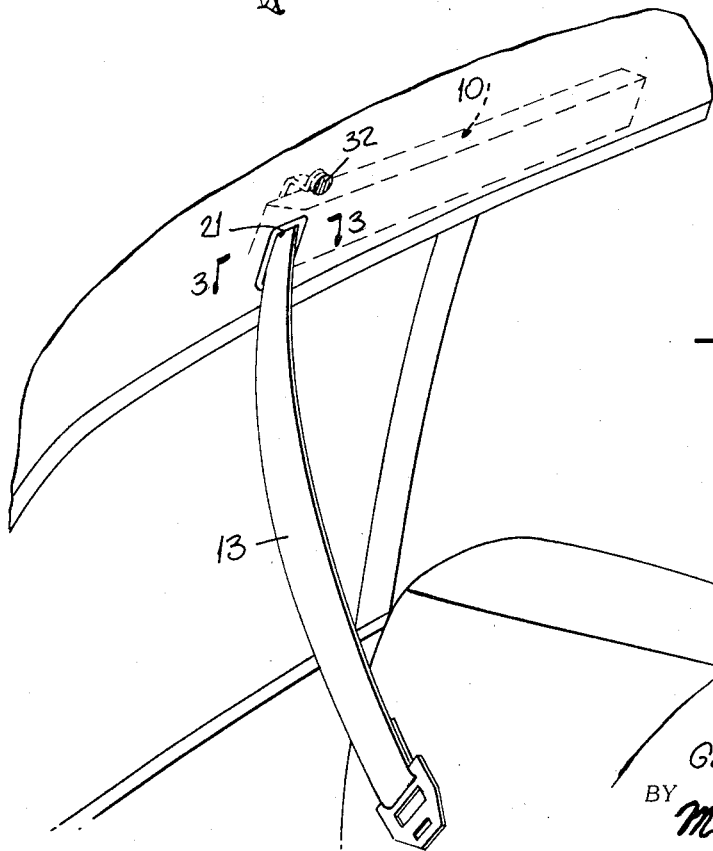
FIGURE 1 is a prospective view of the interior of a vehicle body showing generally the shoulder harness and the retractor.

Referring now in detail to the drawings, an elongated box-like retractor housing 10 is mounted to a structural member of the vehicle body above the side window area. The housing comprises a base 17 and a cover 18. The housing 10 effectively forms a guide for a moveable slide 11 which, together with the constant-tension springs 12 to which it is attached, provides the retraction means of the retractor. The shoulder harness 13 is looped about a roller 25 on the slide and is secured at one end to an anchor 14 which is also secured to a structural member of the vehicle body above the side window area.

The other end of the shoulder harness 13 passes through a slotted aperture 15 in an end fitting 16 on the housing cover 18, and thence through a slotted aperture 19 in the fabric headliner 20 which lines the roof and the upper portion of the sides of the vehicle. The aperture 19 has a plastic rim 21 to protect the fabric from wear and for appearance purposes. This end of the shoulder harness 13 has the means thereon for securing it to the buckle arrangement which holds the shoulder harness over the shoulder and portion of the user's body. For illustrative purposes in this case, the securing means comprises a series of slots 22 formed in the harness end which are adapted to be engaged by a hooked portion of the buckle arrangement. This buckle arrangement and shoulder harness are disclosed in my co-pending application Ser. No. 652,343, filed July 10, 1967. Other heavier and more rigid harness securing means such as metal plate fittings are equally suitable for use with the present invention. Indeed, the heavier and more rigid means are substantially benefited since they are more apt to harm the user when employed with a freely acting retractor.

In its inoperative, retraction storage position, the bulk of the shoulder harness 13 lies doubled within the housing 10, engaged by the slide 11 which rests at the end of the housing 10 remote from the open end 23 through which the shoulder harness enters and leaves. In this position a small portion of the shoulder harness 13 extends into the interior of the vehicle body through the headliner aperture 19 in position to be grasped by the user.

When the user pulls the shoulder harness to its operative position over his shoulder and all or part of the way across his chest, the shoulder harness should be in its fully extended position. This is to obtain direct loading of the harness to the anchor 14 without diverting appreciably into the retractor housing 10. As the shoulder harness 13 pays out of the retractor housing 10, the slide 11 moves along within the guide formed by the housing 10 in opposition to the bias of the constant tension springs 12. When the shoulder harness 13 achieves its extended operative position, the slide 11 has moved in response to a predetermined position beyond the slot 24 in the housing base 17. In this position the roller 25 extends from the open end 23 of the housing 10 to facilitate the direct loading of the shoulder harness 13 to the anchor 14, referred to earlier.

A locking member 26 is attached to the back of the housing base 17 by a pair of resilient flat spring supports 27 riveted to the base 17. The locking member 26 has an extending tab 28 thereon which is aligned to project through the slot 24 under the urging of spring supports 27, to extend into the path of slide 11. The extending tab 28 has an inclined surface 29 which slopes downwardly and outwardly in the direction opposite to the above described predetermined position for the slide 11.

Also affixed to the locking member 26 is a lever 30 which extends over the housing 10 and beyond it towards the interior of the vehicle body behind the headliner 20 and terminates in a right-angled portion 31 which forms a pressure receiving surface. A pushbutton 32 is secured to the headliner 20 in alignment with the pressure surface 31, in contact therewith or close thereto. To actuate the lever 30, the user merely reaches up and presses his finger on the pushbutton 32 which is visible to him within the interior of the vehicle body in the vicinity of the aperture 19. Manual actuation of the lever 30 in this manner overcomes the bias of the spring supports 27 and moves the extending tab 28 in the direction out of the housing 10.

As the slide 11 moves close to the open end 23 of the housing 10 in response to extension of the shoulder harness 13 to its fully extended position, the roller 25 (through the thickness of harness 13 which is looped about it) encounters the inclined surface 29 of the tab 28 extending into the path of the slide 11 through the slot 24. By virtue of its inclined surface 29, the tab 28 rides over the slide 11 (and the harness 13 when it lies between them) and moves substantially out of the housing 10 until the slide 11 is in its predetermined position above described. At this point the tab 28 is free to move and does move back into housing 10 under the urging of spring supports 27. Once more the tab 28 extends into the path of the slide 11, this time to engage its rear 33 and render it inoperative to retract the shoulder harness 13 notwithstanding the urging of constant tension springs 12. The retractor remains locked and inoperative until the user presses the pushbutton 32 to disengage the extending tab 28 from the slide 11. Thus upon release of the buckle arrangement which secures the free end 22 of the harness 13, the free end and its attached metal fitting will not fly up and injure the user.

Although my invention has been shown and described with reference to a particular embodiment it should be understood that departures may be made therefrom within the scope of my invention as set forth in the following claims.

What is claimed is:

1. In a vehicle body, a seat mounted within said body, a headliner lining a portion of the interior of said body and having an aperture therein, a shoulder harness having one end anchored to a structural member of said body behind said headliner and above said seat and its other end extending through said aperture in said headliner to the interior of said body and adapted in operative position to extend over said seat, retraction means supported by said body above said seat behind said headliner and engaging with said shoulder harness, said retraction means having a part thereof moveable to a predetermined position in response to extension of said shoulder harness to a fully extended position, and locking means comprising a locking element constructed and arranged to engage said retraction means part when the latter is in said predetermined position to render said retraction means inoperative to retract said shoulder harness from said extended operative position, said locking means including spring means for biasing said locking means into engagement with said retraction means part and means operatively connected to said locking means for causing the latter to disengage said retraction means part.

2. In a vehicle body according to claim 1 wherein said retraction means comprises an elongated guide along which said retraction means part slides between said predetermined position and a position remote from said predetermined position, said locking means comprises a tab adapted to extend into the path of said retraction means part in the vicinity of said predetermined position and affixed to said guide by a spring-biased support for biasing said tab for movement into said path, said tab being disnegaged from said retraction means part by lever means affixed to said locking means and extending towards the interior of said vehicle body.

3. In a vehicle body according to claim 2 in which said headliner has means thereon adapted for receiving finger pressure and aligned with said lever means and close thereto for manual actuation thereof.

4. In a motor vehicle, a seat, a shoulder harness adapted to extend over said seat, a shoulder harness retractor comprising means anchoring a portion of said harness to a structural member of said vehicle above said seat, retraction means supported above said seat and cooperating with said shoulder harness to provide an extended operative position for said shoulder harness, and a retracted storage position, said retraction means including resilient means operative to bias said shoulder harness into said retracted storage position, locking means spring-biased for movement from a disengaged position to a position of engagement with said retraction means when said harness is in said extended operative position and means operatively connected to said locking means for causing the latter to move from said engaged position to said disengaged position.

5. In a motor vehicle according to claim 4 in which said retraction means comprises a slide engaging said shoulder harness and moveable to a predetermined position in response to extension of said harness to its extended operative position and said locking means comprises an extending portion adapted and based for movement into the path of said slide and having an incline thereon sloping downwardly and outwardly in the direction opposite said predetermined position.

References Cited

UNITED STATES PATENTS

| 2,898,976 | 8/1959 | Barecki | 280—150 |
| 3,371,960 | 3/1968 | Bayer | 280—150 |

BENJAMIN HERSH, *Primary Examiner.*

R. R. SONG, *Assistant Examiner.*

U.S. Cl. X.R.

297—385, 389